Oct. 25, 1960  A. H. BAHNSON, JR  2,957,300
APPARATUS FOR MEASURING THE EFFICIENCY OF TEXTILE MACHINES
Filed June 24, 1957  3 Sheets-Sheet 1
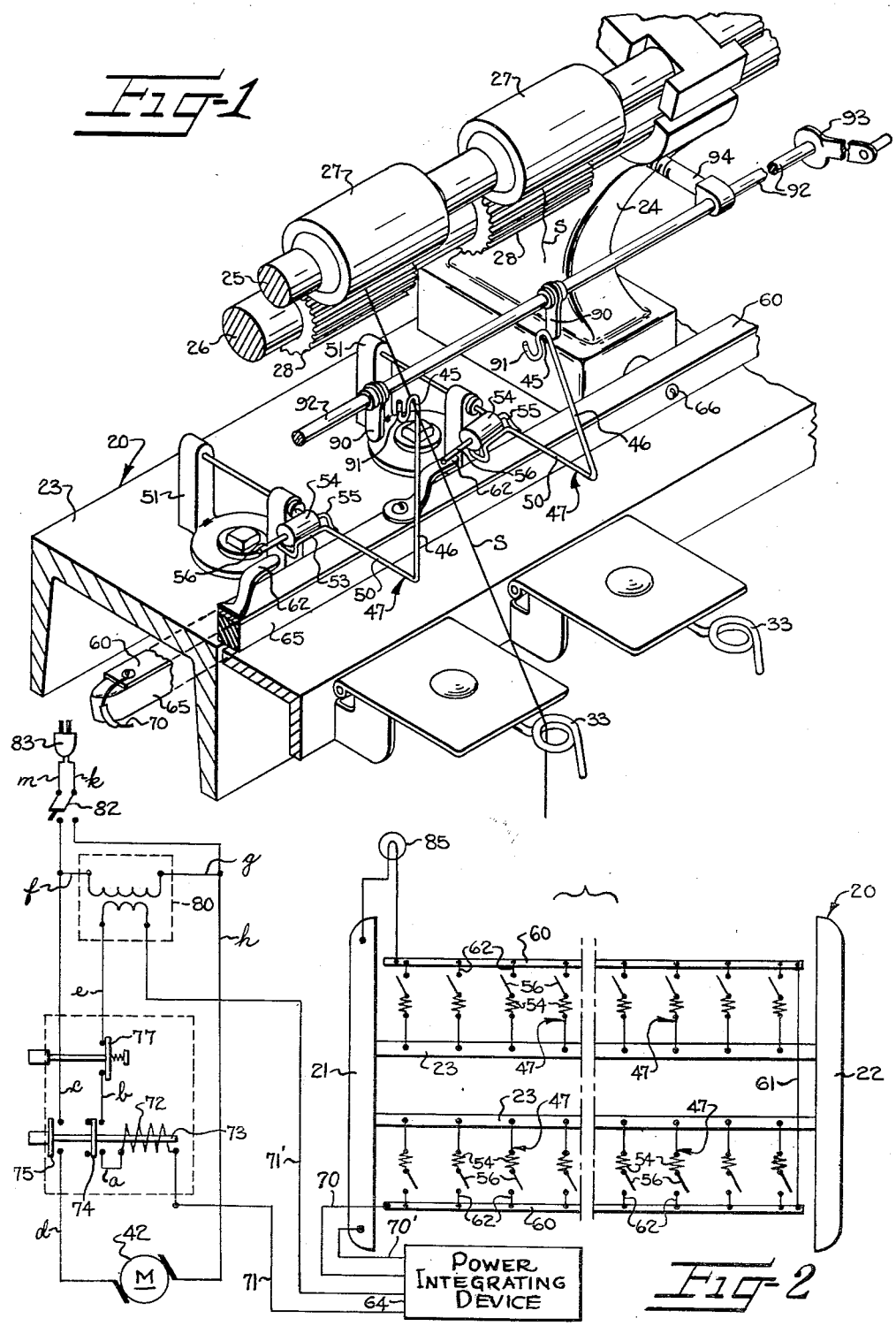

Oct. 25, 1960     A. H. BAHNSON, JR     2,957,300
APPARATUS FOR MEASURING THE EFFICIENCY OF TEXTILE MACHINES
Filed June 24, 1957     3 Sheets-Sheet 2
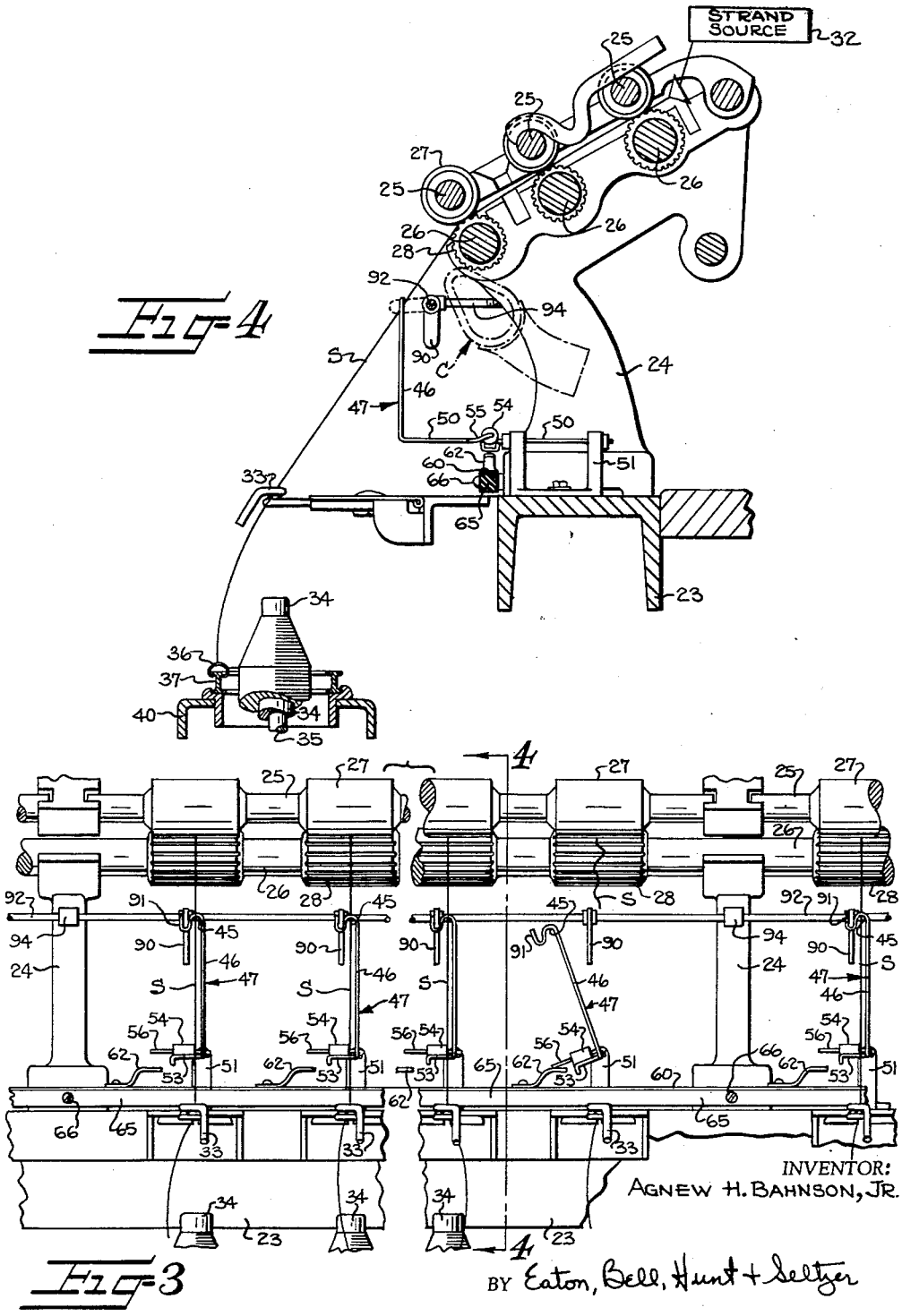
INVENTOR:
AGNEW H. BAHNSON, JR.
BY Eaton, Bell, Hunt + Seltzer
ATTORNEYS.

Oct. 25, 1960 A. H. BAHNSON, JR 2,957,300
APPARATUS FOR MEASURING THE EFFICIENCY OF TEXTILE MACHINES
Filed June 24, 1957 3 Sheets-Sheet 3
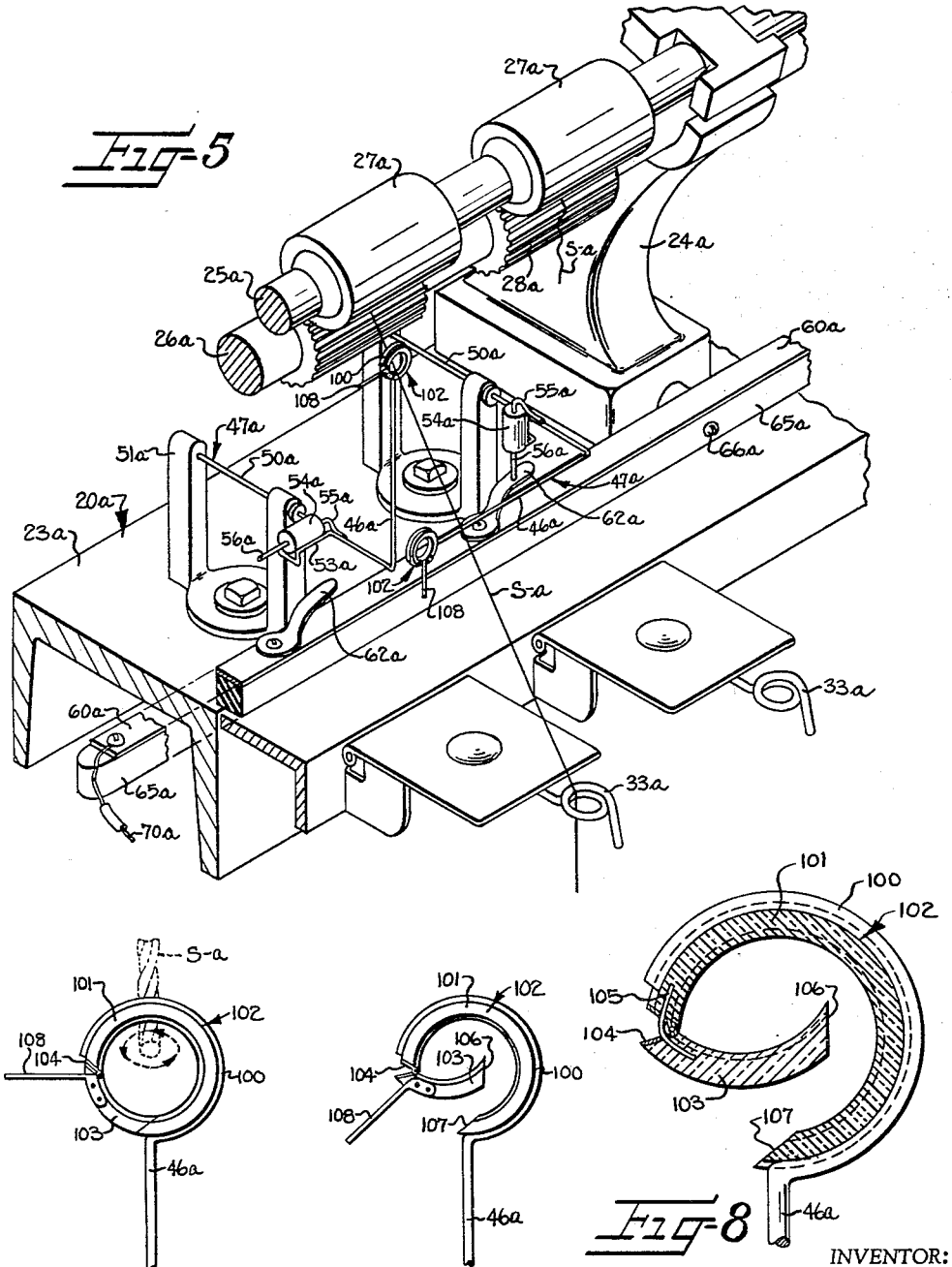
INVENTOR:
AGNEW H. BAHNSON, JR.
BY Eaton, Bell, Hunt & Seltzer
ATTORNEYS

United States Patent Office 2,957,300
Patented Oct. 25, 1960

2,957,300

APPARATUS FOR MEASURING THE EFFICIENCY OF TEXTILE MACHINES

Agnew H. Bahnson, Jr., Reynolda, Winston-Salem, N.C.

Filed June 24, 1957, Ser. No. 667,524

10 Claims. (Cl. 57—1)

This invention generally relates to the art of processing strand-like materials, such as textile strands, as they move, in quantity, from a source or sources to individual receivers. It is an object of this invention to provide an improved means for measuring the efficiency or continuity with which a plurality of such strands are processed.

The present apparatus is particularly adapted to measuring the accumulated extent of the intervals of ends-down of one or more twisting machines, spinning machines, or analogous machines during extended periods of operation to thereby determine the efficiency of the attendants of such machines.

With the advent of suction clearer systems for drafting rolls, many reasons for the immediate detection of broken ends by the attendant no longer existed, as will be explained hereinafter. This has reduced the attendants' incentive to maintain vigilance to such extent that it has become necessary to determine, with some accuracy, how closely the machines approach maximum production during a given period of time, such as a working shift. Such information can be used for determining the wages to be paid to the attendants, quality control, etc.

It is another object of this invention to provide means for automatically sensing the occurrence of the parting of each of a plurality of strands on a single machine or a group of machines, while also sensing the duration of the intervals during which each of any of such strands are parted, and recording the accumulation of such intervals whereby the employer, at the end of a given period, such as at the end of a working shift, may determine the wages which the attendants of such machines will be paid for the work done during that shift.

It is another object of this invention to provide apparatus for carrying out the present method including an elongated electrode or conductor positioned adjacent the path of travel of a plurality of strands with a sensing element engaging each of said strands. Power integrating means is interposed in an electrical circuit to the electrode and, upon the occurrence of a corresponding strand being parted, an electrical power consuming device or load is moved relative to the electrode to correspondingly affect the amount of energy consumption recorded by the power integrating means. It follows that the greater the number of power consuming devices or elements contacting the electrode or, in other words, the greater the intervals during which the power consuming devices are in contact with the electrode over a given period of time, the greater will be the variations in the power consumed thereby as indicated on the power integrating means.

The indicator may be in the form of a watt-hour meter or any other device responsive to variations in the energy consumed.

Some of the objects of the invention having been stated, other objects will appear as the description proceeds when taken in connection with the accompanying drawings, in which—

Figure 1 is a fragmentary isometric view showing one form of the present invention as applied to a spinning machine;

Figure 2 is a schematic diagram of an electrical circuit embodying the present invention;

Figure 3 is a fragmentary front elevation of a portion of a spinning machine showing the first form of the present invention applied thereto;

Figure 4 is a fragmentary vertical sectional view taken substantially along line 4—4 in Figure 3 and showing, in addition, the intermediate and rear drafting rolls, a portion of a ring rail, spindle and bobbin or yarn carrier in solid lines, and also showing, in phantom lines, a portion of a suction clearer head adjacent the bottom front drafting rolls;

Figure 5 is a fragmentary isometric view similar to Figure 1 showing a slightly different form of the invention;

Figure 6 is an enlarged fragmentary elevation of the upper or free end of the sensing element shown in the central portion of Figure 5;

Figure 7 is a view similar to Figure 6 showing the gate at one side of the yarn guide in open position for inserting a strand thereinto;

Figure 8 is an enlarged fragmentary view similar to Figure 6 showing the strand guide in section and showing, in particular, resilient means for returning the gate to closed position.

There are many different types of strand processing machines to which the principles of the present invention may be applied and the present disclosure illustrates the principles of the present invention as applied to a spinning machine, by way of example. For many past years, scavenger rolls have been used on spinning and similar machines for taking up or collecting residual yarns or strands as they were fed through the drafting rolls whenever such strands became parted inadvertently. On such machines, although no method had been conceived for determining the efficiency of the attendants of such machines, the employer was assured of vigilance on the part of the attendants in detecting and piecing the broken ends or "ends-down," since the ends-down, themselves, created incentive on the part of the machine attendants to be vigilant and piece or tie such ends-down as soon as possible upon their occurrence. This was due to the fact that, if the ends-down were not detected promptly and the ends tied or pieced, the yarn would accumulate on the scavenger rolls to such an extent as to make it difficult for the operator or attendant to remove such accumulations from the rolls or to even damage the scavenger rolls or adjacent rolls or other parts of the machine.

However, with the advent of pneumatic clearer systems for textile machines, particularly suction heads positioned adjacent the drafting rolls for receiving and carrying away residual yarn, lint and foreign matter from the drafting zone, the primary incentive creating vigilance on the part of the attendants of such machines no longer existed, since the yarn would not accumulate at the rolls or drafting zone, but was carried away from the drafting zone by the pneumatic clearer devices upon the yarn being parted between the drafting zone and the yarn carrier or spindle. As a result, the use of such clearing systems, while having many advantages, have had the disadvantage of causing an excess of waste yarn as well as indirectly causing a reduction in the production of a machine normally having a much higher production capacity.

As heretofore stated, the embodiments of the present invention are applicable to any of many different types of machines which process a plurality of strands simultaneously and which, in so doing, moves the strands, either independently or as a unit, from a common source or independent sources to a common receiver or an individual receiver for each strand. Since the problem of determining the efficiency at which a machine is maintained or operated by an attendant or operator is of particular concern in the spinning and twisting of textile strands, the present invention is shown in association with a spinning machine.

The spinning machine comprises a frame broadly designated at 20 and includes end frame members 21, 22 to which opposite ends of a pair of beams or roll stand supports 23 are connected (Figure 2). As shown in Figures 1, 3 and 4, each of the beams or roll stand supports 23 has a plurality of spaced roll stands 24 fixed thereon, on which top and bottom drafting rolls 25, 26 are mounted, as is usual. The top and bottom rolls 25, 26 are provided with the usual longitudinally spaced bosses 27, 28, the upper bosses usually being smooth and covered with a resilient material and the lower bosses 28 usually being fluted. The top and bottom rolls 25, 26 are driven at progressively increasing speeds from the back to the front for attenuating strands S as they are drawn from a source or individual sources, such as a creel of spools, indicated diagrammatically at 32 (Figure 4). A suction clearer C is partially illustrated in phantom lines in Figure 4. A further description of the clearer C is deemed unnecessary, since their structure and function of collecting and disposing of residual fibers, strands and other foreign matter is well known in the art.

The strands pass from between the bosses 27, 28 of the respective top and bottom rolls 25, 26 and then downwardly and forwardly at an angle, through a thread guide 33 to a receiver or take-up means embodied in a spool, bobbin or yarn carrier 34. The yarn or strand S is usually guided to each spool or yarn carrier 34 by means of a traveler 36 which revolves about a ring 37 carried by a vertically reciprocal ring rail 40. Each bobbin or yarn carrier 34 is mounted on a spindle 35 which is driven to rotate in a conventional manner. Such machines are usually driven by a motive means which is shown in the form of an electric motor indicated at 42 in Figure 2.

Now, in order to indicate the accumulated "ends-down" time or active "spindle minutes" over a given work period, such as at the end of each working shift during which the spinning machine is in operation, each strand S passes through an eye 45, which is shown in the form of an inverted substantially U-shaped portion, on the upper end of a substantially vertical portion 46 of a sensing element or feeler broadly designated at 47. The feeler 47 may be positioned at any desired point between the strand source and the strand take-up or receiving means 34 shown in Figure 4. However, the eye or looped portion 45 of the sensing element or feeler 47 is preferably positioned forwardly of and closely adjacent the bight of the front top and bottom rolls 25, 26.

In this instance, each feeler 47 is substantially L-shaped and its lower substantially horizontal portion 50 is journaled in a corresponding bearing block 51 suitably secured to the corresponding beam or frame member 23. The feeler 47 is made from an electrically conductive material or metal and is thus grounded to the frame of the machine. The substantially horizontal portion 50 of each feeler or sensing element 47 is formed with an outwardly projecting cradle portion 53 for supporting an electrical power consuming device 54 which is shown in the form of a relatively small resistor. The resistors 54 may be adhesively or otherwise secured to the respective cradles 53.

Opposite ends of each resistor 54 have respective conductors 55, 56 extending therefrom, the conductor 55 being connected to the substantially horizontal portion 50 of the corresponding feeler 47. The conductor 55 may be connected to the feeler 47 by any suitable means such as solder. Since each feeler 47 is grounded to the machine frame 20, it is apparent that the conductor 55 also grounds the corresponding side or end of each resistor 54 to the machine frame.

Spaced beneath the horizontal portions 50 and the cradles 53 of all the sensing elements or feelers 47, throughout the length of the machine and at each side thereof, is a common electrode or conductor 60 which is shown in the form of a plate or bar, but which may be in the form of a wire or rod suitably insulated from the machine frame. It will be observed in Figure 2 that corresponding ends of the elongated conductors or electrodes 60 are connected to opposite ends of a wire or conductor 61.

The conductors or electrodes 60 are each provided with a plurality of longitudinally spaced contact members projecting upwardly therefrom and then longitudinally, there being one of these contacts provided adjacent the free end of each of the conductors 56 extending from a corresponding resistor 54. It will be noted that, while the strand S is passing through the eye 45 of the corresponding feeler 47 and at proper tension, the free end of the conductor 56 extending from the corresponding resistor 54 is spaced above and out of contact with the corresponding contact 62.

However, upon the parting of a corresponding strand S, the corresponding resistor 54, which also serves as a weight member, overbalances the feeler 47 and causes the same to tilt substantially in the manner in which the second finger from the right is shown in Figure 3. In so doing, the contact 56 extending from the corresponding resistor 54 engages the contact 62 therebeneath which causes current to flow through the resistor 54, since the other end of the resistor is grounded as heretofore described and the elongated conductors 60 are connected to a source of current in a manner to be later described. As heretofore stated, the resistors 54 exemplify individual power consuming devices which will absorb and dissipate electrical energy. This may be effected by various means other than resistance, such as inductance, the purpose being to vary the electrical power or energy integrated or totalized by the power integrating means 64 (Figure 2) in proportion to the number of ends-down over a given period of time and the intervals during which individual ends are parted. The contacts 62 and the resistors 54, with their conductors 56 and other associated parts, may be enclosed in a plastic, heat-sealed container or containers, or by any other means, to prevent lint and other foreign matter from collecting thereon.

The electrode or common conductor 60 at each side of the machine is adhesively or otherwise suitably secured to a corresponding insulation bar 65 suitably supported by the frame of the machine. In this instance, the insulation bars 65 are each secured to the corresponding roll stands 24, as by screws 66 (Figures 1, 3 and 4).

Now, it will be observed in Figure 2 that the electrical power integrating means is interposed in a low voltage circuit to the elongated electrode or conductor 60 at one side of the machine. To this end, a wire or conductor 70 extends from the end of the common conductor or electrode 60 at one side of the machine, and remote from the connecting conductor 61, to the power integrating means 64. A second wire 70' connects the end frame member 21 to the power integrating means 64. The other side of the electrical power integrating means 64 has a conductor or wire 71 leading therefrom to one end of a holding coil 72 of a push-button-actuated relay or start switch 73 having a pair of normally open switch bars 74, 75 thereon. When the relay switch 73 is closed, the switch bars 74, 75 establish contact between respective pairs of wires or conductors a, b and c, d. The end of wire a remote from the switch bar 74 is connected to one end of the coil 72.

The end of the wire b opposite from the switch bar 74 is connected to one side of a normally closed push-button stop switch 77, to the other side of which a conductor or wire e is connected. The wire e extends to the secondary coil of a step-down transformer 80 and the other side of this secondary coil is connected by means of conductor 71' to the power integrating means 64 to form a closed low voltage circuit. The primary coil of the step-down transformer 80 has conductors or wires *f, g* leading from opposite sides thereof to the wire *c* and a conductor or wire *h*, respectively. Corresponding ends of the wires *d* and *h* are shown connected to opposite ends of the electric motor 42, although it is apparent that they may be connected to a suitable motor starter or other electrical device for controlling operation of the machine. The end of the wire *h* opposite from the motor 42, and the corresponding end of conductor *c* are connected to one side of a manually operable master switch 82, to the other side of which corresponding ends of lead wires *k, m* are connected, the lead wires *k, m* being connected to a suitable source of electrical energy embodied in a plug 83.

The free end of that electrode 60 remote from the electrical power integrating means 64 (Figure 2) has a continuous power consuming means 85 connected thereto which is grounded to the frame member 21. The latter means 85 is illustrated in the form of an incandescent lamp which serves as a visual indication that the circuit is functioning.

It is apparent that, upon the start switch 73 being manually closed, current flows to the electric motor 42 and the holding coil 72 so that, although manual pressure is released from the push-button 73, the coil 72 maintains the switch 73 in closed position. The low voltage current from the secondary of the transformer 80 then flows through the coil 72 and also flows through the electrical power integrating means 64. Upon any one or more of the strands S being parted, a corresponding change or corresponding changes are effected in the power integrating means through energization of a corresponding resistor or plurality of resistors, such as resistors 54.

It is readily apparent that a watt-hour meter will indicate a certain consumption of energy and will indicate further increases in consumption of electrical energy in proportion to the intermediate intervals in which any of the resistors 54 are excited by the parting of corresponding strands.

The electric lamp or other energy-consuming device represented thereby could be omitted and the resistors would, when used in association with a watt-hour meter, cause the watt-hour meter to operate or record only during those intervals in which one or more of the resistors were excited by the parting of corresponding strands and, here again, it is apparent that the greater the number of resistors so excited, the greater would be accumulated reading on the watt-hour meter at the end of a given period of time.

It is apparent that, although the circuits to the individual resistors 54 are heretofore disclosed as being normally open, the contacts 62 may be positioned at the opposite side of the respective sensing fingers or feelers 47 from that shown in the drawings, without departing from the spirit of the invention. In this instance, the circuit to the resistors would be normally closed so the watt-hour meter or other power integrating means 65 would be under a full load throughout the operation of the machine at such times that all strands were intact. On the other hand, upon any one or more of the strands being parted or becoming unduly slackened, the circuit to the corresponding resistor or resistors or other power consuming devices would be broken, thereby causing a corresponding decrease in the reading of the power integrating means 64. In either instance, the contacts 62 may be omitted, since the conductors on the resistors 54 may engage the corresponding electrode 60 for energizing the same.

In many instances, strand processing machines of the character described are not operated for extended periods of time, such as between working shifts. During such times, textile strands, in particular, may become slackened to such extent that conductors 56 on corresponding resistors 54 may engage the corresponding contacts 62 so that a false reading would be effected in the power integrating means 64 upon initially restarting the machine or machines. In order to avoid this circumstance, locking or restraining means are provided for maintaining the sensing elements or feelers 47 in substantially normal operating position independently of the tension in the strands S during periods in which machines are not operating. Of course, such locking or restraining means might not be required in the event of the electrode and/or its contacts 62 being spaced below the horizontal portions 50 of the sensing elements 47 to such extent that the sensing elements would have to move a relatively great distance in order to cause the conductors 56 on corresponding resistors to engage corresponding contacts 62.

In this instance, the feeler restraining or locking means is shown in the form of a plurality of latches or locking arms 90, one of which is provided adjacent to and rearwardly of the free end of each sensing element 47. The upper portion, eye or looped portion 45 of each sensing element 47 is provided with an outwardly formed hook 91 thereon which forms a recess or notch for receiving the free end or medial portion of the corresponding latch 90. The latches 90 at each side of the machine are fixed on a substantially horizontally disposed shaft 92 having a crank 93 on at least one end thereof (Figure 1) and which is journaled in a plurality of bearing members or arms 94 fixed to and projecting forwardly from corresponding roll stands 24. During normal operation of the machine, the latches 90 occupy substantially the position shown in Figures 1 and 4. However, when the machine is stopped, the attendant merely rotates the shaft 92 at each side of the machine to cause the latches 90 to occupy the broken-line position or substantially horizontal position shown in Figure 4, whereby the latches 90 engage the hooks 91 on the upper ends of the corresponding feelers 47 to prevent the feelers 47 from tilting in the event that the yarn or strands become slackened during the periods in which the machine is not operated. The handle 93 is shown by way of example only, since it is apparent that the handle 93 represents automatic means, such as a solenoid or similar device, or manual means, for rotating shaft 92. The shaft 92 may be rotated automatically, in the proper direction, whenever the machine is started or stopped.

In Figures 5, 6, 7 and 8, a modified or second form of the invention is shown which is quite similar to the form of the invention shown in Figures 1 through 4, with the exception of the manner in which the eye is constructed at the upper end of each sensing element or feeler such as that indicated at 47 in Figures 1, 3 and 4. In all other respects, the parts shown in Figure 5 are substantially the same as those shown in Figures 1, 3 and 4 and, will therefore, bear the same reference characters with the small letter "*a*" affixed thereto in order to avoid repetitive description.

It will be observed in Figures 5, 6, 7 and 8, that whereas the upper end of the vertical portion or shank 46 of the sensing element or feeler 47 in Figures 1, 3 and 4 is provided with an inverted substantially U-shaped eye thereon through which the strand S passes, the upper or free end of the shank 46*a* of each sensing element or feeler 47*a* has an arcuate substantially three-quarter circular portion 100 formed on the upper end thereof in which a substantially three-quarter circular segmental and stationary portion 101 of a substantially circular or two-part guide eye 102 is clampingly secured. The guide eye 102 is preferably made from a smooth material, such as ceramic or plastic, in order to provide a smooth surface for engagement with the yarn or corresponding strands S–*a*. The eye 102*a* includes a gate portion 103 which is in the form of a relatively small segment so that, collectively, the two sections, 101 and 103, form an endless guide eye 102. The segment or gate 103 is pivotally connected, at its upper end, to the corresponding end of the large segmental portion 101 by any suitable means, such as a hinge 104. The leaves of the hinge 104 may be adhesively or otherwise suitably secured to the proximal angular-formed surfaces of the two sections 101, 103 of the guide eye 102. A suitable spring 105, which is shown in the form of a torsion spring, engages the proximal portions of the two sections 101, 103 adjacent the hinge 104 and normally urges the gate 103 outwardly so that it occupies the position shown in Figures 5 and 6 during normal operation of the machine.

It will be noted that the lower portion of the free end of the gate 103 also has an angular-formed surface 106 thereon which mates with a corresponding surface 107 on the free lower end of the large segmental portion 101 of the guide eye 102. This insures that the curved inner surface of the gate 103 occupies a position flush with the curved inner surface of the larger portion 101 of the guide eye 102 when the gate 103 is in closed position. The gate 103 is provided for the insertion of the corresponding strand S–a once it has been parted and pieced or tied. In order to open the gate 103, a suitable handle or trip arm 108 is suitably secured to and projects outwardly from the gate 103. It is thus seen that the attendant merely moves the trip arm 108 downwardly to swing the gate 103 to open position for the insertion of the corresponding strand S–a within the guide eye 102 and, upon releasing the trip arm 108, the gate 103 returns to normal or closed position as shown in Figures 5 and 6.

The guide eye 102 has advantages over the inverted U-shaped portion 45 of the first form of the present invention in that it may be relatively large and still confine the corresponding strand S–a within the same during traversing movement of the strand longitudinally of the corresponding drafting rolls. Also, when the machine is shut down, this permits the strand to become slackened considerably without moving out of the guide eye 102 as might be the case with the inverted U-shaped portion of each sensing element 47 as shown in Figures 1, 3 and 4. This slackening of the yarn, which occurs when the machine is inoperative, or has not been operated for some time, also permits the sensing fingers 47a to move considerably to one side of the normal path of travel of the corresponding strand S–a.

The side of the guide eye 102 at which the gate 103 is provided depends, to some extent, upon the direction of twist imparted to the strand, as shown in Figure 6. The mating surfaces between the larger portion 101 and the gate 103 preferably extend inwardly at an angle toward the direction of twist of the strand S–a.

It will be noted that the electrode or main conductor 60a and its corresponding contact elements 62a are spaced a substantially greater distance below the horizontal portions 50a of the sensing elements 47a as compared to the distance at which the electrodes 60 and their contact elements 62 are spaced below the horizontal portions 50 of the sensing elements 47 shown in Figures 1, 3 and 4 so that it is further insured that none of the resistors 54a shown in Figure 5 is inadvertently energized merely by the slackening of the corresponding strands S–a. By way of example, it will be noted that the sensing element 47a shown in the upper right-hand portion of Figure 5 has moved substantially one-fourth revolution or 90 degrees to one side of its normal vertical position in establishing contact between a corresponding contact element 62a and the conductor 56a extending from the corresponding resistor 54a.

It is apparent that, by spacing the electrode 60a and its contact element 62a from the horizontal portions 50a of the corresponding sensing elements 47a as shown in Figure 5 and utilizing the closed substantially circular or endless guide eyes 102, this substantially obviates the necessity of providing any locking means for maintaining the sensing elements 47a in upright or substantially normal operating position when the machine is shut down for substantially long periods of time.

It is thus seen that I have provided a novel means for detecting and recording ends-down on textile and other strand-processing machines which process large quantities of individual strands, so the reading on the recording means may be compared with a given standard to determine the efficiency or vigilance of the operator or attendant of such machines and to thereby provide an accurate basis for which the employer may determine the wages to be paid to the operator or attendant. It is apparent that other elements may be substituted for many of the elements shown in the annexed drawings for carrying out the present method, without departing from the spirit of the invention.

In the drawings and specification there have been set forth preferred embodiments of the invention and, although specific terms are employed, they are used in a generic and descriptive sense only and not for purposes of limitation, the scope of the invention being defined in the claims.

I claim:

1. In a spinning machine having drafting rolls for attenuating strands of textile material and spindles for receiving and taking up said strands from the drafting rolls, said machine also having at least one elongated frame member thereon spaced beneath the drafting rolls; the combination of a sensing element for each of said strands comprising a substantially L-shaped member having a substantially vertical portion and a substantially horizontal portion, means pivotally supporting said horizontal portion and grounding the same to said frame member, a thread guide on the upper portion of each vertical portion of each sensing element through which the corresponding strand normally moves whereby the strand maintains the substantially vertical portion of the corresponding sensing element in substantially vertical position, a cradle mounted on and extending outwardly to overbalance a medial portion of the horizontal portion of each sensing element, a resistor fixed on each cradle and being electrically connected to the corresponding sensing element, a conductor extending from each of said resistors, an elongated electrode extending beneath all of the sensing elements at at least one side of the machine and being engageable by the conductor extending from each resistor upon the parting of a corresponding strand, a source of power, and a watt-hour meter connected at one side to said source of power and at the other side to said electrode and to said frame member for registering variations in consumption of electrical energy affected by energization of any of the resistors with the parting of a corresponding strand.

2. A structure according to claim 1 in which each thread guide is in the form of an inverted substantially U-shaped portion on the upper end of the vertical portion of each sensing element.

3. A structure according to claim 2 in which each U-shaped portion is provided with a hook portion thereon, a shaft journaled in said machine adjacent the upper ends of the sensing elements, said shaft having a plurality of latches thereon, each of the latches being engageable with the hook portion of a corresponding sensing element.

4. A structure according to claim 1 in which each thread guide is in the form of a substantially circular member on an upper portion of the vertical portion of each sensing element, said member being made from at least two parts, one part being fixed to the sensing element, the other part being pivotally connected to said one part to form a gate, and resilient means normally urging the other part to closed position.

5. A structure according to claim 4 in which each of said gates is provided with a handle for swinging the same to open position for insertion of a strand into the corresponding guide.

6. Apparatus for determining the efficiency of a machine for processing a plurality of advancing strands of textile material comprising, in combination, a source of power, a power integrating device, means for connecting said power integrating device to said source of power, a sensing element associated with each of said strands and responsive to a parted condition in said strands, a power consuming device carried by each sensing element, said power consuming devices arranged to be moved by said sensing elements between an inoperative position and an operative position to connect said power consuming devices in electrical parallel relationship with each other and to said source of power through said power integrating device.

7. In a spinning machine having drafting rolls for attenuating and advancing strands of textile material and spindles for receiving and taking up said advancing strands from the drafting rolls, apparatus for determining the efficiency of the spinning machine for processing the advancing strands of textile material comprising, in combination, means associated with each of said advancing strands for sensing the occurrence of a parted condition in each advancing strand and means operatively connected to said strand sensing means for cumulative totalizing the durations of said parted conditions in all of said strands.

8. In a spinning machine having drafting rolls for at-attenuating and advancing strands of textile material and spindles for receiving and taking up said advancing strands from the drafting rolls, apparatus for determining the efficiency of the spinning machine for processing the advancing strands of textile material comprising, in combination, a source of power, a power integrating device, means for connecting said power integrating device to said source of power, a power consuming device for each of said strands, all of said power consuming devices being arranged to be connected in electrical parallel relationship with each other and to said source of power through said power integrating device, and means on said spinning machine for sensing a parted condition in each advancing strand and for connecting the power consuming device associated with said parted strand to said power integrating device.

9. In a spinning machine having drafting rolls for attenuating and advancing strands of textile material and spindles for receiving and taking up said advancing strands from the drafting rolls, apparatus for determining the efficiency of the spinning machine for processing the advancing strands of textile material comprising, in combination, a source of power, a watt-hour meter, means for connecting said watt-hour meter to said source of power, a power consuming device for each of said strands, all of said power consuming devices being arranged to be connected in electrical parallel relationship with each other and to said source of power through said watt-hour meter, and means on said spinning machine for sensing a parted condition in each advancing strand and for connecting the power consuming device associated with said parted strand to said watt-hour meter.

10. Apparatus for determining the efficiency of a machine for processing a plurality of advancing strands of textile material comprising, in combination, a source of power, a power integrating device, means for connecting said power integrating device to said source of power, a sensing element associated with each of said strands and responsive to a parted condition in said strands, a resistor carried by each sensing element, said resistors arranged to be moved by said sensing elements between an inoperative position and an operative position to connect said resistors in electrical parallel relationship with each other and to said source of power through said power integrating device.

References Cited in the file of this patent

UNITED STATES PATENTS

| | | |
|---|---|---|
| 1,526,337 | Hartley | Feb. 17, 1925 |
| 1,946,290 | Lord | Feb. 6, 1934 |
| 2,181,728 | Greentree | Nov. 28, 1939 |
| 2,216,730 | Berger | Oct. 8, 1940 |
| 2,242,889 | Keeler | May 20, 1941 |
| 2,276,134 | Windham | Mar. 10, 1942 |
| 2,350,177 | MacKen | May 30, 1944 |
| 2,352,647 | Linzenmeyer et al. | July 4, 1944 |
| 2,368,761 | Hogan | Feb. 6, 1945 |
| 2,394,661 | Brunner | Feb. 12, 1946 |
| 2,398,015 | Leathers | Apr. 9, 1946 |
| 2,579,407 | Turner | Dec. 18, 1951 |
| 2,646,119 | Wood | July 21, 1953 |
| 2,812,632 | Tillett | Nov. 12, 1957 |